United States Patent [19]

Doshi

[11] Patent Number: 4,898,695
[45] Date of Patent: Feb. 6, 1990

[54] METHOD FOR TINTING HYDROPHILIC PLASTIC ARTICLES

[75] Inventor: Praful Doshi, Poway, Calif.

[73] Assignee: Pilkington Visioncare Holdings, Inc., Menlo Park, Calif.

[21] Appl. No.: 265,523

[22] Filed: Nov. 1, 1988

[51] Int. Cl.$^4$ .............................................. B29D 11/00
[52] U.S. Cl. ....................................... 264/2.6; 264/27
[58] Field of Search .................. 264/2.6, 2.7; 351/162; 8/507

[56] References Cited

U.S. PATENT DOCUMENTS

| Re. 27,401 | 6/1972 | Wichterle et al. | 260/2.5 |
|---|---|---|---|
| 2,976,576 | 3/1961 | Wichterle | 18/58 |
| 3,476,499 | 11/1969 | Wichterle | 8/4 |
| 3,895,169 | 7/1975 | Wichterle | 428/420 |
| 4,056,496 | 11/1977 | Mancini et al. | 260/29.6 |
| 4,188,353 | 2/1980 | Nufe | 264/2.5 |
| 4,208,362 | 6/1980 | Deichert et al. | 264/1 |
| 4,252,421 | 2/1981 | Foley | 351/162 |
| 4,379,893 | 4/1983 | O'Malley | 525/386 |
| 4,494,954 | 1/1985 | Suminoe et al. | 8/507 |
| 4,569,858 | 2/1986 | Lim et al. | 427/164 |
| 4,719,657 | 1/1988 | Bawa | 8/453 |

FOREIGN PATENT DOCUMENTS

| 84-3024431 | 10/1984 | European Pat. Off. |
| 84-1114713 | 10/1986 | Fed. Rep. of Germany |
| 1583492 | 1/1961 | United Kingdom |
| 14021233 | 7/1975 | United Kingdom |

OTHER PUBLICATIONS

Drake et al, U.S. Defensive Publ. T102, 101, dated 8/3/82.
European Pat. Appl., Prics et al, corresp. to U.S. Ser. No. 06/487,784 filed 11.04.83, entitled, Tinted Hydrogel Plastic Articles and Method of Tinting Them.

*Primary Examiner*—James Lowe
*Attorney, Agent, or Firm*—Charles E. Cates; Frank T. Barber

[57] ABSTRACT

Tinted hydrophilic plastic articles, such as soft contact lenses, are prepared by carrying out the tinting operation while the hydrophilic material is still in its non-hydrated state. Tinting at this point avoids the need for use of swelling agents and also permits integration of the tinting procedure into an overall automated manufacturing operation. A preferred embodiment of the invention is an integrated process for producing a tinted soft contact lens comprising the steps of providing a casting mold having an arbor formed as a cup shaped container, filling said container with a monomeric lens forming liquid, polymerizing said liquid to produce a lens blank having one optical surface formed by the bottom of said cup shaped container, generating (e.g., machining) a second optical surface on said blank while said casting mold is mounted on a precision mandrel, tinting said resulting lens by impregnating the pores of said blank with a dispersion of a solubilized vat dye precursor and subsequently precipitatintg an insoluble vat dye within said pores, the blank being rinsed both before and after precipitation of said vat dye while still mounted in said casting mold, drying said blank to return it to a substantially xerogel state, edging and further processing said blank to convert it into a tinted hydrated soft contact lens, and subsequently hydrating said lens. While the foregoing is the preferred embodiment, the method may be utilized at the xerogel stage in all other presently known methods of forming lenses, e.g., lathing, cast molding and spin casting.

11 Claims, No Drawings

METHOD FOR TINTING HYDROPHILIC PLASTIC ARTICLES

FIELD OF THE INVENTION

This invention relates to the tinting of hydrophilic soft contact lenses as an integral step in a lens manufacturing process.

BACKGROUND AND PRIOR ART

Hydrophilic polymers useful as soft contact lenses typically are lightly cross-linked copolymers derived from one or more hydroxyl-group containing monomers. In their hydrated state, these polymers are known generally in the art as "hydrogels" and in their unhydrated state as "xerogels". Xerogels are specifically defined as coherent, three-dimensional polymer structures or networks which have the ability to absorb or imbibe large quantities of water without dissolution. At the present time, the specific class of polymers which have gained particular commercial acceptance as soft contact lenses are those derived from acrylic esters. U.S. Pat. Nos. 2,976,576 and Re. 27,401, issued to O. Wichterle and D. Lim on Mar. 28, 1961 and on June 20, 1972, respectively, are early patents which describe the use of acrylic ester hydrogels as soft contact lenses. Many subsequent patents as well as other technical articles are directed to the preparation of numerous other acrylic ester-type hydrogels which differ primarily in the type and/or percentage of comonomers contained therein.

In the main, acrylic ester hydrogels are all derived by copolymerizing a major amount of a water-soluble monoester of acrylic or methacrylic acid in which the ester moiety contains at least one hydrophilic group and a minor amount of a bifunctional diester of acrylic or methacrylic acid which cross links the hydrophilic group-containing monomer as it polymerizes, and by hydrating the copolymer formed.

Various methods have been used for machining or otherwise forming the above polymeric materials in their xerogel form into lenses. In one approach, casting molds are charged with the desired monomers, and polymerization is initiated therein by a catalyst mixed in with the monomers, in such manner that both optical surfaces are formed within the mold. Another approach involves use of a casting mold to form one optical surface, followed by use of a lathe or other machining technique to cut the other optical surface. In U.S. Pat. No. 4,188,353 a method of making plastic aspheric lenses by casting a liquid monomer in a container, polymerizing the monomer to form a solid having an aspheric optical surface formed within the container and cutting a second optical surface on the solid lens material with the container supporting the lens material during the cutting and polishing operation is disclosed.

After the lens is formed and/or machined, as in any of the above procedures, it is normally removed from the forming means and then edged, washed, polished, hydrated, sterilized, inspected and packaged according to known procedures. The hydration is customarily effected by placing the lens in saline solution for a period of several hours. For certain end uses, the hydrating agent may be an aqueous buffered solution, and the hydration may be followed by equilibration of the lens into physiological saline.

A market has been developed in recent years for tinted hydrophilic soft contact lenses. The tinting may be useful to protect the user from bright light. Lenses may also be tinted for cosmetic purposes, not only to enhance the natural coloring of the eyes, but sometimes to conceal disfigurements.

The tinting of materials of this nature has been a demanding assignment. The colorants must be incorporated without interfering with the optical properties of the final product. They must resist leaching out on storage and autoclaving, and must not undergo decomposition in the presence of reagents used in daily cleaning and sterilization of the plastic material. They must not fade upon prolonged exposure to light, and they must be non-toxic and physiologically inert, as well as mechanically non-irritating. From a commercial standpoint, it is necessary that the colorants be applied in a process which is not so complex or time-consuming or labor intensive as to be impractical.

Known commercial methods of tinting soft contact lenses are based on producing the contact lenses in their final hydrated state, packaging them and then, as an added segment in the manufacturing process, subjecting them to the proposed tinting procedures. A review of the art with respect to tinting at this stage is set forth in European Patent Application No. 84302443.1, Pub. No. 0 122 771, Oct. 24, 1984. The added manufacturing segment has increased the time and complexity of the overall procedure and, especially in the case of applying tint to masked areas of soft contact lenses, has resulted in duplication and repetition of steps carried out in the preceding phases of the manufacture. The conventional wisdom is that once a lens is hydrated, it cannot be returned to the xerogel state for further fabrication because the redrying step renders the lens too brittle to work (e.g., machine), and the best place to dye a lens is during hydration. Accordingly, it was thought not to be feasible to dye a lens during processing.

It is an object of the present invention to provide a process in which the tinting of the hydrogel materials is effected as part of an integrated manufacturing procedure, thus enabling significant reductions in manufacturing time as well as costs of labor and materials.

It is another object of the invention to produce tinted materials which are enhanced from the standpoint of color quality and reproducibility of patterns.

Other objects and advantages will be apparent from the following description and examples.

SUMMARY OF THE INVENTION

This invention is based on the discovery that hydrophilic plastic materials can be tinted while in their xerogel state. That is, the tinting operation can be effected at an early stage in the manufacturing process, before the polymerized material is subjected to hydration. It has been found that applying the tinting materials at this early stage not only improves the preciseness and reproducibility of the manufacturing process but also enhances the quality of the end product. Further, tinting the polymer while still non-hydrated permits the tinting step to be incorporated as an integral part of the manufacturing process, rather than reserving it as a separate, subsequent manufacturing operation. The discovery therefore significantly reduces repetitive handling of the hydrophilic plastic materials and for the first time enables efficient automation of the complete operation. The tinting agents which have been found useful in the foregoing are solubilized vat dye precursors which may be precipitated as an insoluble dye within the pores of the non-hydrated polymeric material.

The invention therefore may be described in general terms as a method for producing a tinted hydrophilic plastic article comprising the steps of preparing a plastic material in a xerogel form, impregnating the pores of said material with a solubilized vat dye while the material is still in the non-hydrated state, and then precipitating an insoluble vat dye within said pores. The tinted hydrophilic plastic material may be polished, finished, (hydrated to the desired water content) sterilized and thereafter inspected and packaged as is customary in the art.

A preferred embodiment of the invention is an integrated process for producing a tinted soft contact lens comprising the steps of providing a casting mold having an arbor formed as a cup shaped container, filling said container with a monomeric lens forming liquid, polymerizing said liquid to produce a lens blank having one optical surface formed by the bottom of said cup shaped container, generating (e.g., machining) a second optical surface on said blank while said casting mold is mounted on a precision mandrel, tinting said resulting lens by impregnating the pores of said blank with a dispersion of a solubilized vat dye precursor and subsequently precipitating an insoluble vat dye within said pores, the blank being rinsed both before and after precipitation of said vat dye while still mounted in said casting mold, drying said blank to return it to a substantially xerogel state, edging and further processing said blank to convert it into a tinted hydrated soft contact lens, and subsequently hydrating said lens. While the foregoing is the preferred embodiment, the method may be utilized at the xerogel stage in all other presently known methods of forming lenses, e.g. lathing, cast molding and spin casting.

In another preferred embodiment, the in-line tinting step is carried out after generating the first optical surface by casting in a suitable mold, by tinting said article by impregnating the pores of said article with a dispersion of a solubilized vat dye as a precursor at a temperature in the range 35° to 85° Centigrade, rinsing said article, precipitating the vat dye in a water insoluble form in the pores of said article and rinsing said article a second time; drying said article to substantially its former xerogel state; converting said xerogel article to a packaged, fully hydrated contact lens.

DETAILED DESCRIPTION OF THE INVENTION

Although the invention is applicable to the tinting of hydrophilic plastic materials in general, the preferred application of the invention involves the coloring of hydrophilic soft contact lenses, and the invention will be described in terms of such application.

In the preferred embodiment, the procedure is initiated by casting an optical blank in a cup-shaped casting mold having a polished convex or concave bottom. In casting the optical blank, the desired monomers and catalysts are injected into the mold and, upon polymerization, a solid blank or button is formed having an optical bottom surface formed by the polished convex or concave bottom of the mold. To produce the second optical surface of the lens blank, the casting mold is mounted on a cutting instrument having a precision mandrel, and the desired lens surface configuration is generated by lathing, grinding or laser machining.

In the above procedure the casting liquid may be any of the conventional monomers and mixtures thereof which are known in the art for the production of soft contact lenses or other hydrogel plastic materials. For example, the hydroxyethylmethacrylate and ethylene glycol dimethacrylate monomer mixtures described in the aforementioned U.S. Pat. Nos. 2,976,576 and Re. 27,401 may be used as starting materials, as well as the hydroxyalkyl methacrylates and vinyl pyrrolidone described in U.S. Pat. No. 3,503,393. Specific suitable starting materials include 2-hydroxyethyl methacrylate, 2-hydroxypropyl acrylate, glycerol methacrylate, glycidyl methacrylate, methyl methacrylate, dimethylaminoethyl methacrylate, acrylic acid, methacrylic acid, collagen, acrylamide, diacetone acrylamide, and the like. Included also are the monomeric materials resulting in polymers such as TEFILCON, PHEMFILCON, HEFILCON A, HEFILCON B, PERFILCON A, LIDOFILCON B, TETRAFILCON A, DROXIFILCON A, OCUFILCON B, BUFILCON A, BUFILCON 45, BUFILCON 55, CROFILCON A, DELTAFILCON A, ETAFILCON A, and POLYMACON.

The casting mold itself may comprise an arbor having a cup-shaped upper portion and may be made of thermoplastic materials which have the required strength and stability under polymerizing conditions and which can be molded to have an optical quality surface. Suitable thermoplastic materials include polyolefins, such as polyethylene and polypropylene, nylons, such as Nylon 6 and Nylon 66, propylene copolymers, polysulfones, ethylene vinyl acetate and the like. It is also possible to make the mold from metals or metal alloys.

After the lens forming liquid and catalysts are filled into the casting mold, polymerization is initiated and completed under appropriate known curing conditions, which include curing in an oven or the use of other techniques such as radiation, including U.V. and microwave and the use of a bath with a heat transfer fluid, such as water and silicone oil. After curing, front curve cutting and polishing of the resulting lens blank is accomplished, as indicated above, by mounting the casting mold on a precision cutting instrument.

It is a feature of the present invention that the lens blank, at this stage in its manufacture, while still in the non-hydrated state, and preferably while still mounted in the casting mold arbor, can be tinted by the application of suitable coloring materials. This is in contrast to previous procedures, in which the cut and polished lens was removed from the casting mold for edging, hydration, equilibration, sterilization, etc., and then, as a subsequent separate manufacturing operation, mounted in the usual tinting apparatus and subjected to the application of coloring materials.

The discovery that tinting can be accomplished at this stage has significant advantages. It will be appreciated that, at this point, the lens is at center position in the casting mold arbor, and therefore tinting the lens while retained in this centered position eliminates the previously required extra step of precision-centering the lens again when the tinting was done in a subsequent separate manufacturing operation. Thus, there is a substantial saving in time and effort, as well as an enhancement in reproducibility of the tinted lens. Also, in tinting the lens in the dry state, as in the present invention, improved encapsulation of the dye is achieved, resulting in a deeper colored, better quality product. Further, any limited hydration or swelling of the xerogel that occurs during tinting can be reversed by drying and thus no change or little change in dimensions of the lens is experienced. The lens can then be edged, polished and hydrated as part of the normal process used in hydrating untinted lenses from the xerogel state.

To carry out the tinting at this stage, the usual tinting apparatus, including fixtures, well and plungers, are placed on the lens, and the coloring materials are applied. For the purpose of the present invention, tinting is carried out by first applying a water compatible dispersion of a solubilized leuco sulfate ester of a vat dye as the dye precursor to impregnate the pores of the non-hydrated polymeric material and then precipitating the insoluble dye within the pores by use of a suitable developing solution.

Preferred classes of vat dyes are anthraquinone, anthrone, indigoid and thioindigoid. A large variety of useful solubilized leuco sulfate esters have been devised and synthesized over the years. Many of them are commercially available and in sufficient colors so that mixtures of them are adequate to produce any desired range of hues. The following dye precursors have been found particularly useful in the practice of this invention, which is not in any way limited to this particular selection:

The solubilized leuco sulfate esters of
Dibromodibenzo(b,def)chrysene-7,14-dione 16,23-Dihydroinaphtho(2,3-a:2',3'-i)naphth(2',3':6,7)indolo(2,3-c)carbazole-5,10,15,17,22,24-hexone
N,N,-(9,10-Dihydro-9,10-dioxo-1,5,anthracenediyl)-bis-benzamide
6,6'-Diethoxy- -2,2'-(3H,3'H)bibenzo(b)thiophene-3,3'-dione
7,16-Dichloro-6,15-dihydro-5,9,14,18-anthrazine-tetrone
16,17-Dimethoxydinaphtho(1,2,3-cd:3',2',1'-1m) perylene-5,10-dione It is desirable that the solubilized dye precursor be sufficiently dispersed in the treating solution and that the particles of the dispersion are sufficiently fine. A preferred practice for accomplishing this involves producing the water-compatible dispersion with the aid of ultrasonic vibrations to assist dissolution, and it is usually necessary to heat the dispersion to maximize dissolution of the dye. Depending on the physical characteristics of the solubilized leuco sulfate ester used, many minutes of ultra sonic treatment may be used, but usually for or five minutes will suffice. If an elevated temperature is used, it may range from 35° C. to 85° C., but preferably from 40° C. to 60° C., but optimum conditions are established for each individual solubilized leuco sulfate ester. Following ultrasonic treatment, and heating if approximate, the water-compatible dispersion may be filtered to eliminate any oversize particles.

The treating solution containing the water-compatible dispersion is applied to the non-hydrated lens under predetermined conditions. It usually is sufficient to allow the water-insoluble aggregates to be formed beneath the lens face to only about 10% of the total thickness of the lens. The hue to be imparted by the tinting may be conveniently controlled by observing certain conditions at this stage. Thus, a possible method of intensifying the hue is to increase the proportion of the leuco ester which preferably is from 0.01% to 10% by weight of the impregnating water-compatible dispersion. Another method is to increase the time of exposure to the solution. Usually an exposure of 15 seconds to 2 minutes is preferred, and to avoid longer times it would generally be preferable to increases the concentration of the leuco ester.

The time of exposure of the hydrophilic polymer to the impregnating water-compatible dispersion may be controlled by rinsing the dispersion from the polymer with distilled water. Drops of purified water adhering to the polymer surface can cause pale spots of reduced dye concentration by extracting solubilized leuco sulfate ester from the polymer. In extreme cases this can cause rejection of a significant percentage of dyed objects during quality control inspection. The problem can be removed by following the purified water rinse immediately by a detergent rinse so that any residual water film is uniform and minimal. A detergent rinsing solution which has been found satisfactory is the Barnes-Hind cleaning solution for soft contact lenses, but other solutions are possible.

After the lens has been treated with the dye precursor and then rinsed with purified water and surfactant solution, the dye is fixed on the lens by precipitating the dye in insoluble form within the pores of the lens. It is believed that the precipitation step involves two stages; first, an acid-catalyzed hydrolysis of the sulfate ester to produce the corresponding leuco or reduced form of the vat dye. This hydrolysis can take place in the absence of acid, but under such conditions the reaction is slow, and therefore the use of an acid catalyst is preferred. In the second stage, the reduced leuco form is oxidized to its vat dye which could be accomplished simply by exposure to air and accelerated by ultraviolate radiation. Preferably this two-stage process is carried out through the use of an acidic oxidizing medium, which may be e.g., a solution of nitrous acid oxidizing agent in an acidic catalyst such as acetic acid or sulfuric acid.

The acidic catalyst may be used in a broad range of concentrations of from 0.1–30% by weight, but more usually 1–5%. Generally the acidic catalyst and the oxidizing agent are contained in the same solution and are applied in suitable concentrations and at appropriate temperatures to the rinsed areas of the hydrophilic plastic article which have previously been permeated by dye precursors.

If the oxidizing agent is sodium nitrite, as is preferred, it may be included in the water-compatible dispersion of the dye precursor rather than with the acidic catalyst. This procedure offers the advantages that the developing solution cannot then evolve toxic nitrous fumes on storage, and also that there is much less danger of over-oxidizing the vat dye. For this purpose, the concentration of the oxidizing agent in the water-compatible dye dispersion is preferably from 0.1–20% by weight, but more commonly from 0.5–5%.

When precipitating the vat dye with the developing solution, the end point of the process is apparent because precipitation results in a distinct color change. To facilitate recognition of the endpoint, a standard dyed object may be placed in proximity for comparison.

Upon completion of the tinting operation as above, the hydrophilic plastic material becomes partially hydrated. In order to facilitate the next dry stage edging operation, it is necessary to evaporate any water on the plastic material by placing in an oven at warming temperatures for a period of a few minutes.

The dry tinted lens is then dismounted from the casting mold arbor and edge and polished in customary fashion, and then it may be placed in an ultrasonic cleaning bath to remove polishing compound and also to remove any loosely adhered dye particles.

Following this the lens is hydrated, also according to customary practice. Preferably, this is effected by soaking in physiological saline for 12 to 18 hours. Finally, the lens is scrutinized by quality control procedure and may be sealed into an appropriate vial and autoclaved at e.g. 120° C. for 50 minutes. Autoclaving fulfills the dual purpose of sterilizing the product and aiding aggregation of the dye in the hydrogel matrix. The final product is then ready for packaging and labeling.

The following examples describe specific embodiments which are illustrative of the invention. All parts and percentages are by weight unless otherwise specified.

EXAMPLE 1

A polyethylene casting mold arbor formed as a cup-shaped container is filled with a casting liquid prepared by mixing together in 15 ml. ethylene glycol as solvent, 15 ml. of a monomer mixture containing by weight 95 percent hydroxyethyl methacrylate (HEMA) and 5 percent ethylene glycol dimethacrylate (EGDMA), with 0.05 ml. of a 6 percent aqueous solution of ammonium persulfate and 0.05 ml. of a 12 percent aqueous sodium methabisulfite. The casting mold is placed in an oven where copolymerization is conducted at approximately 70° C. for 12 hours. The casting mold arbor containing the polymerized lens blank is then mounted on a lathe having a precision mandrel for centering of the lens, and the front curve is generated, followed by polishing.

Tinting fixtures, well, and plungers are now placed on the lens while still mounted on the casting arbor. 2.0 g of solubilized 16,17-dimethoxydinaphtho(1,2,3-cd:3',2',1'-1m) perylene-5,10-dione is thoroughly dispersed in 20 ml. of purified water. After warming to 50° C. this water-compatible dye dispersion is applied to cover one surface of the non-hydrated lens blank in the casting arbor, for a time of 30 seconds, after which the excess is removed by rinsing with purified water.

To a solution of 2 ml. of concentrated sulfuric acid in 50 ml. purified water is added 0.5 g of sodium nitrite, and the resulting nitrous acid developing solution is applied to the plastic lens which had been treated with the dye precursor. After 1.5 minutes the lens contained in the arbor is thoroughly rinsed with purified water. The lens is found to have acquired a light shade of aqua-green. A medium shade of aqua-green can be produced by increasing the contact time of the water-compatible dye precursor dispersion to 1.5 minutes, and a fairly dark shade can be produced by increasing the time to 3.5 minutes.

Following the tinting operation, the lens is placed in an oven at 55° C. for 5 minutes to return the lens to substantially the xerogel state, and then the lens is dismounted from the casting arbor and edged, polished and subjected to ultrasonic cleaning.

The lens is hydrated overnight by soaking in physiological saline solution, and then sterilized, inspected, packaged and labeled.

EXAMPLE 2

A xerogel button used for the manufacture of lenses under the tradename CSI is mounted on an arbor, a base curve is cut and polished. It is remounted to cut a front curve. After polishing, the lens is removed from the arbor.

The lens is placed on a dome and tinting fixtures; well and plungers are placed on the lens. 1.00 gm of solubilized 16,17-Dimethoxydinaphtho(1,2,3-cd:3',2',1'-1m) perylene-5,10-dione and 0.6 gm of solubilized N,N,-(9,10-Dihydro-9,10-dioxo-1,5-anthracene-diyl)-bisbenzamide are dispersed in 16 ml. of methanol and 24 ml. of distilled water. After warming to 40° C., this dye dispersion is applied to cover one surface of the nonhydrated lens for a time of 35 sec. after which the excess is removed by rinsing with distilled water and diluted Barnes-Hind Contact Lens Cleaner.

To a solution of 2 ml. of concentrated sulfuric acid in 50 ml. distilled water is added 0.5 gm of sodium nitrite. The resulting nitrous acid solution is applied to the lens treated with dye precursor. After 1.0 minutes, the lens is rinsed with distilled water. The lens is found to have acquired a light shade of yellow-green.

Following the tinting operation, the lens is placed in a 50° C. oven for 10 minutes to evaporate water on the lens. The lens is edged, polished and subjected to ultrasonic cleaning.

The lens is hydrated overnight by soaking in physiological saline solution and then inspected, packaged, sterilized and labeled.

EXAMPLE 3

An arbor containing a molded base curve bufilcon 55 button is placed in a lathe. The front curve is cut and polished.

Tinting fixtures, well, and plungers are placed on the lens. 1.8 gm of solubilized 7,16-Dichloro-6,15-dihydro-5,9,14,18-anthrazine-tetrone dispersed in 4 ml. of methanol and 36 ml. of distilled water. After warming to 62° C. this dye dispersion is applied to cover one surface of the nonhydrated lens for a time of 25 sec., after which the excess is removed by rinsing with distilled water and diluted Barnes-Hind Contact Lens Cleaner.

To a solution of 2 ml. of concentrated sulfuric acid in 50 ml. distilled water is added 0.25 gm of sodium nitrite. The resulting nitrous acid solution is applied to the lens treated with dye precursor. After 1.5 minutes, the lens is rinsed with distilled water. The lens is found to have acquired a light shade of blue.

Following the tinting operation, the lens is placed in a 50° C. oven for 10 minutes to evaporate water on the lens. The lens is edged, polished and subjected to ultrasonic cleaning.

The lens is hydrated overnight by soaking in physiological saline solution and then inspected, packaged, sterilized and labeled.

EXAMPLE 4

A BUFILCON 45 button is mounted on an arbor. A base curve is cut and polished. It is remounted and the front curve is generated, then polished. While still on the arbor, tinting fixtures, well, and plungers are placed on the lens. 1.650 gm of solubilized N,N'-(9,10-Dihydro-9,10-dioxo-1,5-anthracenediyl)-bisbenzamide is dispersed in 14 ml. of methanol and 26 ml. of distilled water. After warming to 32° C., this dye dispersion is applied to cover one surface of the nonhydrated lens for a time of 30 sec., after which the excess is removed by rinsing with distilled water and diluted Barnes-Hind Contact Lens Cleaner.

To a solution of 2 ml. of concentrated sulfuric acid in 50 ml. distilled water is added 0.5 gm of sodium nitrite. The resulting nitrous acid solution is applied to the lens treated with dye precursor. After 1.0 minutes, the lens is rinsed with distilled water. The lens is found to have acquired a light shade of yellow.

Following the tinting operation, the lens is placed in a 50° C. oven for 10 minutes to evaporate water on the lens. The lens is edged, polished and subjected to ultrasonic cleaning.

The lens is hydrated overnight by soaking in physiological saline solution and then inspected, packaged, sterilized and labeled.

EXAMPLE 5

A POLYMACON button is mounted on an arbor. A base curve is generated, then polished. It is remounted and a front curve is generated. After polishing, the lens remains on the arbor, and tinting fixtures, well, and plungers are placed on the lens. 2.2 gm of solubilized 16,23-Dihydroinaphtho(2,3-a:2'3'-i)naphth (2',3':6,7)indolo(2,3-c) carbazole-5,10,15,17,22,24-hexone are dispersed in 10 ml. of methanol and 10 ml. of distilled water. After warming to 62° C., this dye dispersion is applied to cover one surface of the nonhydrated lens for a time of 120 sec., after which the excess is removed by rinsing with distilled water and diluted Barnes-Hind Contact Lens Cleaner.

To a solution of 2 ml. of concentrated sulfuric acid in 50 ml. distilled water is added 0.5 gm of sodium nitrite. The resulting nitrous acid solution is applied to the lens treated with dye precursor. After 1.0 minutes, the lens is rinsed with distilled water. The lens is found to have acquired a light shade of brown.

Following the tinting operation, the lens is placed in a 50° C. oven for 10 minutes to evaporate water on the lens. The lens is edged, polished and subjected to ultrasonic cleaning.

The lens is hydrated overnight by soaking in physiological saline solution and then inspected, packaged, sterilized and labeled.

What is claimed is:

1. A method for producing a tinted, hyrated contact lens wherein a tinting step is carried out as an in-line step during the process of converting a monomeric, lens forming material to a packaged, fully hydrated contact lens, comprising the steps of:
   1. converting the monomeric material to an intermediate contact lens article in the xerogel state;
   2. generating at least one optical surface on said article;
   3. tinting said article by impregnating the pores of said article with a dispersion of a solubilized vat dye as a precursor at a temperature in the range 35° to 85° degrees Centigrade, rinsing said article, precipitating the vat dye in a water insoluble form in the pores of said article and rinsing said article a second time;
   4. drying said article to substantially its former xerogel state;
   5. converting said xerogel article to a packaged, fully hydrated contact lens.

2. The method of claim 1 wherein said dye is a vat dye selected from the group consisting of anthraquinone, anthrone, indigoid and thioindigoid dyes.

3. The method of claim 1 wherein the said vat dye is precipitated by oxidation.

4. The method of claim 1 wherein the said dye is precipitated with an acidic oxidizing medium.

5. The method of claim 1 wherein said vat dye precursor is applied to the convex face of said lens.

6. The method of claim 1 wherein the center and the edge of the lens are masked, thus leaving a clear edge around an annular tinted area approximately a human iris.

7. A method for producing a tinted hydrated soft contact lens comprising the steps of providing a casting mold having an arbor formed as a cup shaped container, filling said container with a monomeric lens forming liquid, polymerizing said liquid to produce a blank having one optical surface formed by the bottom of said cup shaped container, generating a second optical surface on said blank while said casting mold is mounted on a precision mandrel, tinting said resulting lens by impregnating the pores of said blank with a dispersion of a solubilized vat dye precursor and subsequently precipitating an insoluble vat dye within said pores, the blank being rinsed both before and after precipitation of said vat dye while still mounted in said casting mold, drying said blank to return it to a substantially xerogel state, edging and further processing said blank to convert it into a tinted hydrated soft contact lens.

8. The method of claim 7 wherein said vat dye is selected from the group consisting of anthraquinone, anthrone, indigoid and thioindigoid dyes.

9. The method of claim 7 wherein said vat dye is precipitated by oxidation.

10. The method of claim 7 wherein the said vat dye is precipitated with an acidic oxidizing medium.

11. A method for producing a tinted soft contact lens comprising the steps of preparing a hydrophilic plastic lens material in the xerogel state, impregnating pores of said material with a dispersion of a solubilized dye precursor, precipitating an insoluble dye within said pores, and subsequently hydrating said lens material to the hydrogel state.

* * * * *